United States Patent [19]

Ejiri

[11] 4,381,547

[45] Apr. 26, 1983

[54] PICTURE DEFORMING PROCESS

[75] Inventor: Koichi Ejiri, Chiba, Japan

[73] Assignee: Ricoh Co., Ltd., Tokyo, Japan

[21] Appl. No.: 208,273

[22] Filed: Nov. 19, 1980

[30] Foreign Application Priority Data

Nov. 28, 1979 [JP] Japan .............................. 54-154110

[51] Int. Cl.$^3$ .......................... G06F 15/20; G06F 3/14
[52] U.S. Cl. ..................................... 382/47; 364/577; 382/56
[58] Field of Search ......................... 364/515, 577, 723

[56] References Cited

U.S. PATENT DOCUMENTS 4,267,573  5/1981  Chaikin et al. ...................... 364/515
4,303,947 12/1981  Stoffel ................................ 364/515 X

*Primary Examiner*—Edward J. Wise
*Attorney, Agent, or Firm*—Oblon, Fisher, Spivak, McClelland & Maier

[57] ABSTRACT

In a process of geometrically deforming an original picture by changing the picture element pitches, weight coefficients g calculated for the picture elements according to preselected magnification variation factors are read out of a first memory whenever original picture data F are read successively, the contents Fg of a second memory are read out according to addresses defined by the data g and F, and the addition result of the data Fg is divided by the addition result of the data g, thereby to obtain a geometrically deformed picture from the original picture.

2 Claims, 6 Drawing Figures

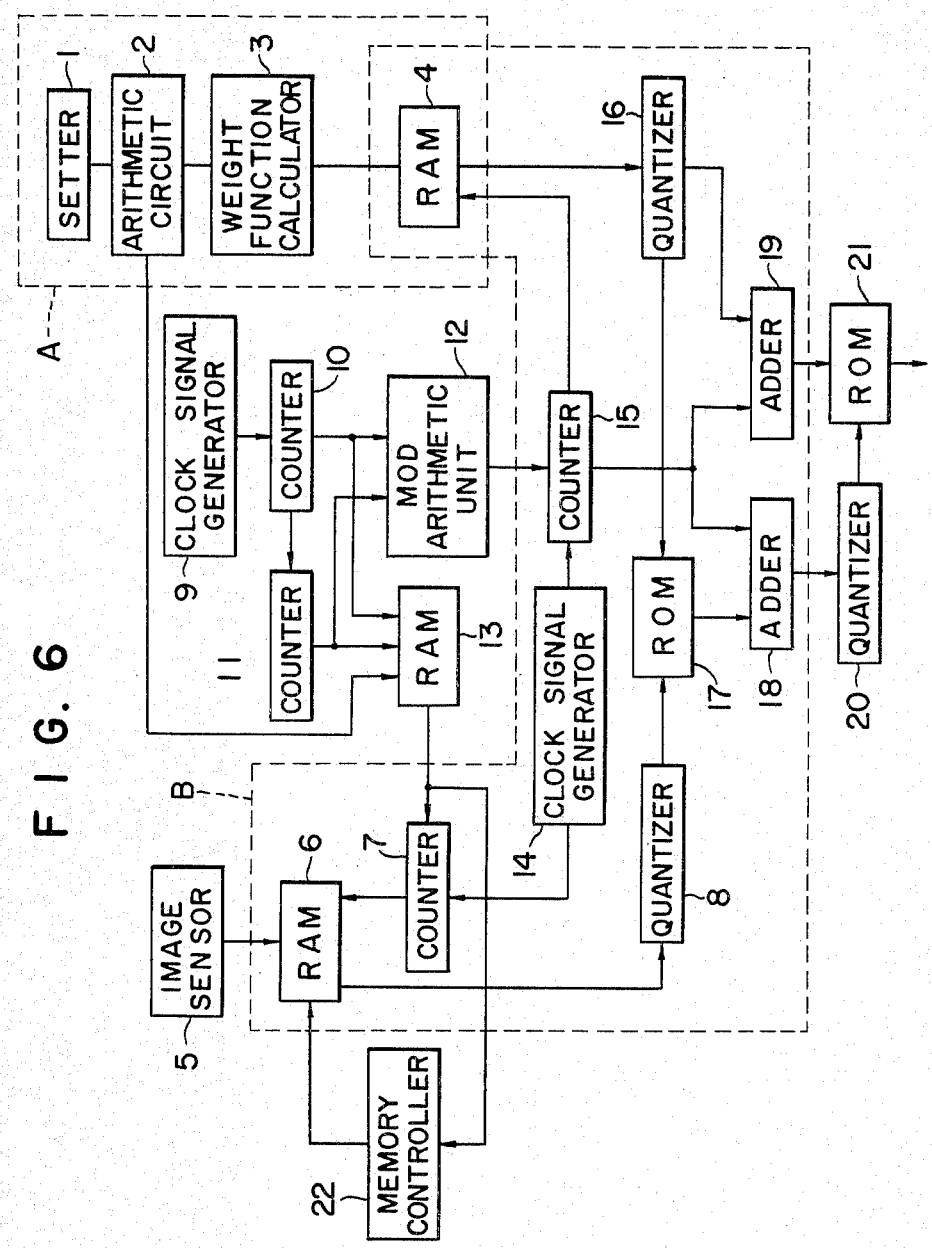
F I G. 6

PICTURE DEFORMING PROCESS

BACKGROUND OF THE INVENTION

This invention relates to a picture deforming process in which digital picture data obtained by scanning and sampling an original picture by the picture element are processed to reproduce a picture with a picture element pitch different from that employed in reading the original picture.

In general, in digital picture input and output devices such as facsimile devices, their output picture element pitches are fixed. Therefore, in order to enlarge, contract or incline an original picture, i.e. to geometrically deform the original picture, it is necessary that the original picture is subjected to deformation process, i.e. the original picture is sampled again with a picture element pitch different from that employed in the previous or initial reading of the original picture, thereby to output picture data subjected to deformation process for every picture element.

Heretofore, for instance in the case where magnification variation is carried out according to a picture deforming process of this type, predetermined processes (as described below) are successively carried out for every picture element thereby to process the entire picture on the basis of the fundamental principle that if a picture element at a position a on a picture is sampled againat a position b, then the magnification of the picture can be varied, as shown in FIG. 1. That is, a method is employed in which, under the conditions that in FIG. 1 the coordinates of a picture element on an original picture is (i,j) with pitches px and py and the coordinates of a picture element on the magnification-varied picture is (k,l) with pitches qx and qy, a magnification-varied picture element $S(k,l)$ is represented by using four picture elements $F(i,j)$, $F(i+1, j)$, $F(i, j+1)$ and $F(i+1, j+1)$ of the original picture surrounding the picture element $S(k,l)$. In this connection, it is assumed that the original point of the coordinate (i,j) system of the picture elements of the original picture is at the same position as that of the original point of the coordinate (k,l) system of the picture elements of the magnification-varied picture. However, even if these original points are at different positions, no problem is caused in the production of the magnification-varied picture.

In the method, parameter conversion is carried out according to the following expressions in order to represent the coordinate (i,j) system and the coordinate (k,l) system with a common rectangular coordinate system (x,y):

$$Rx = px/qx, \quad Ry = py/qy \quad (1)$$

where Rx is the magnification variation factor in the direction of x, and Ry is the magnification variation factor in the direction of y.

$$\left. \begin{array}{l} xi = k \cdot qx/px = k/Rx \\ yj = l \cdot qy/py = l/Ry \end{array} \right\} \ldots (2)$$

$$i = [xi], \quad j = [yj] \quad (3)$$

where [xi] and [yj] are the maximum integers not larger than x and y in the common coordinate system (x,y), respectively.

Therefore, the position $(\Delta x, \Delta y)$ on the x-y coordinate system of the magnification-varied picture element $S(k,l)$ with the original picture element $F(i,j)$ as the original point can be obtained from the following equations (4) as is apparent from the relationships indicated in FIG. 1:

$$\left. \begin{array}{l} \Delta x = qx \cdot k - px \cdot i = xi - i \\ \Delta y = qy \cdot l - py \cdot j = yj - j \end{array} \right\} \ldots (4)$$

Thus, the density level of the magnification-varied picture element $S(k,l)$ can be interpolated by a plurality of original picture elements $F(i+i', j+j')$ (where $-M<i'<M+1$, and $-N<j'<N+1$) surrounding it.

A variety of interpolation methods are known in the art. One of the interpolation methods is a minimum error interpolation method employing a sine function. By way of example, a picture deforming process utilizing the minimum error interpolation method will be described. However, it should be noted that picture deforming processes employing other interpolation methods can similarly process pictures merely by using different functions.

In the interpolation method using the sine function, the weight coefficient $g(ri)$ of an estimated picture element $S(k,l)$ is determined by the distances between the picture elements $S(k,l)$ and the original picture elements surrounding it. If the distance $(ri)$ are long, then the weight coefficient becomes excessively small. Therefore, the range of the value $(ri)$ is usually $0 \leq ri \leq 2$. The weight coefficient $g(ri)$ is a sine function as expressed by the following equation (5):

$$g(x) = \frac{\sin 2\pi x}{2\pi x} \quad (5)$$

The density level of a magnification-varied picture element $S(k,l)$ is determined by using the various parameters obtained as described above, according to the steps indicated in FIG. 2. First, the magnification variation factors Rx and Ry are set, and the address of an output picture element to be subjected to magnification variation is set. Thereafter, in the step B, calculations are carried out according to the equations (2) and (3) described above. In the step C, the data of $2M \times 2N$ original picture elements surrounding a picture element $F(i,j)$ are read out. Between the steps D and E, calculation is carried out according to the equation (4), and according to the results of calculation a weight coefficient $g\{r(i',j')\}$ corresponding to the distances $r(i',j')$ between the output picture element $S(k,l)$ and the surrounding picture elements is calculated. Finally, in the step E, a process for deterimining the density level of the output picture element $S(k,l)$ is carried out.

As is clear from the above description, in the conventional picture deforming process, a number of processes must be carried out for every output picture element as shown in FIG. 2. Accordingly, the processing time is considerably long; and not only adders and subtractors but also integrators and function generators are required for carrying out the various processes, with the result that the device is intricate in arrangement and high in manufacturing cost.

SUMMARY OF THE INVENTION

In view of the foregoing, an object of this invention is to provide a picture deforming process in which picture deformation can be achieved quickly by relatively simple processing.

Another object of the invention is to provide a picture deforming process which can be practiced with a relatively simple circuit which is low in manufacturing cost.

The nature, principle and utility of the invention will become more apparent from the following detailed description when read in conjunction with the accompanying drawings.

BRIEF DESCRIPTION OF THE DRAWINGS

In the accompanying drawings:

FIG. 6 is a block diagram showing one example of a circuit for practicing the picture deforming process of the invention.

DETAILED DESCRIPTION OF THE INVENTION

Figure 1:
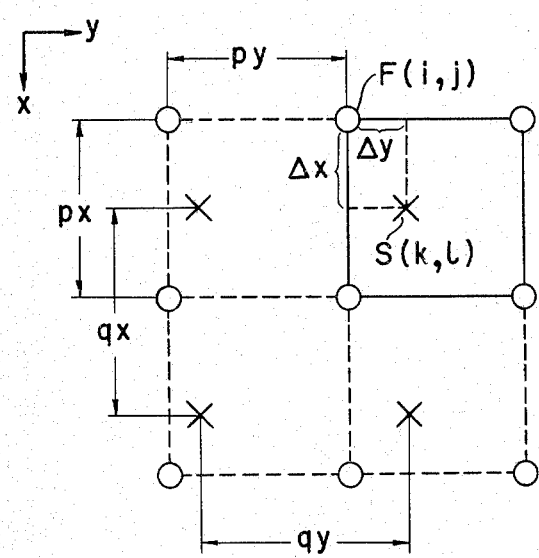
FIG. 1 is an explanatory diagram for a description of the magnification variation of a picture read by the picture element.

As conducive to a full understanding of this invention, first the fundamental concept of a picture deforming processing according to the invention will be described.

In general, in deforming an original picture (for instance in enlarging or contracting it), the magnification variation factors Rx and Ry must be continuously variable. Values $m_1$, $m_2$, $n_1$ and $n_2$ satisfying the following expression exist as long as the values Rx and Ry are rational numbers.

$$\left. \begin{array}{l} Rx \times m_1 = m_2 \\ Ry \times n_1 = n_2 \end{array} \right\} \ldots (6)$$

In this connection, because of the actual magnification variation factor setting range, difficulties are scarcely caused even if the following limits are added:

$$\left. \begin{array}{l} 1 \leq m_1 \text{ (or } n_1) \leq 30 \\ 1 \leq m_2 \text{ (or } n_2) \leq 30 \end{array} \right\} \ldots (7)$$

Under the condition (7), the modification variation factor Rx close to one (1) can be obtained as follows:

$$Rx = \begin{cases} 1.0, \frac{29}{30} = 0.967, \frac{28}{29} = 0.966, \frac{27}{28} = 0.964, \ldots \\ 1.0, \frac{30}{29} = 1.034, \frac{29}{28} = 1.036, \frac{28}{27} = 1.037, \ldots \end{cases}$$

Thus, substantially continuous values can be selected as Rx.

Similarly, substantially continuous values can be selected as Ry.

Figure 3:
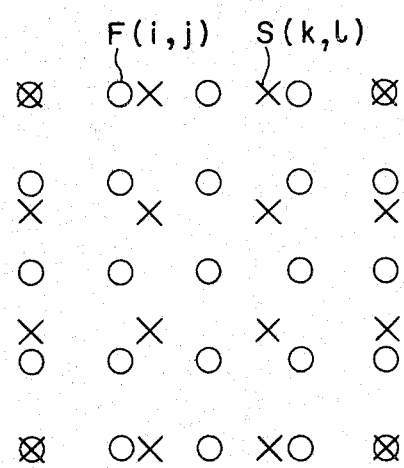
FIG. 3 is an explanatory diagram showing one example of the positional relationship between original picture elements and magnification-varied picture elements in a picture deforming process according to this invention.

Under this condition, the positional relationship between an original picture element and the magnification-varied picture element occurs periodically as shown in FIG. 3. In FIG. 3, the magnification variation factor Rx=Ry=¾; that is, a 4-picture-element period for F(i,j) and a 3-picture-element period for S(k,l).

Figure 2:
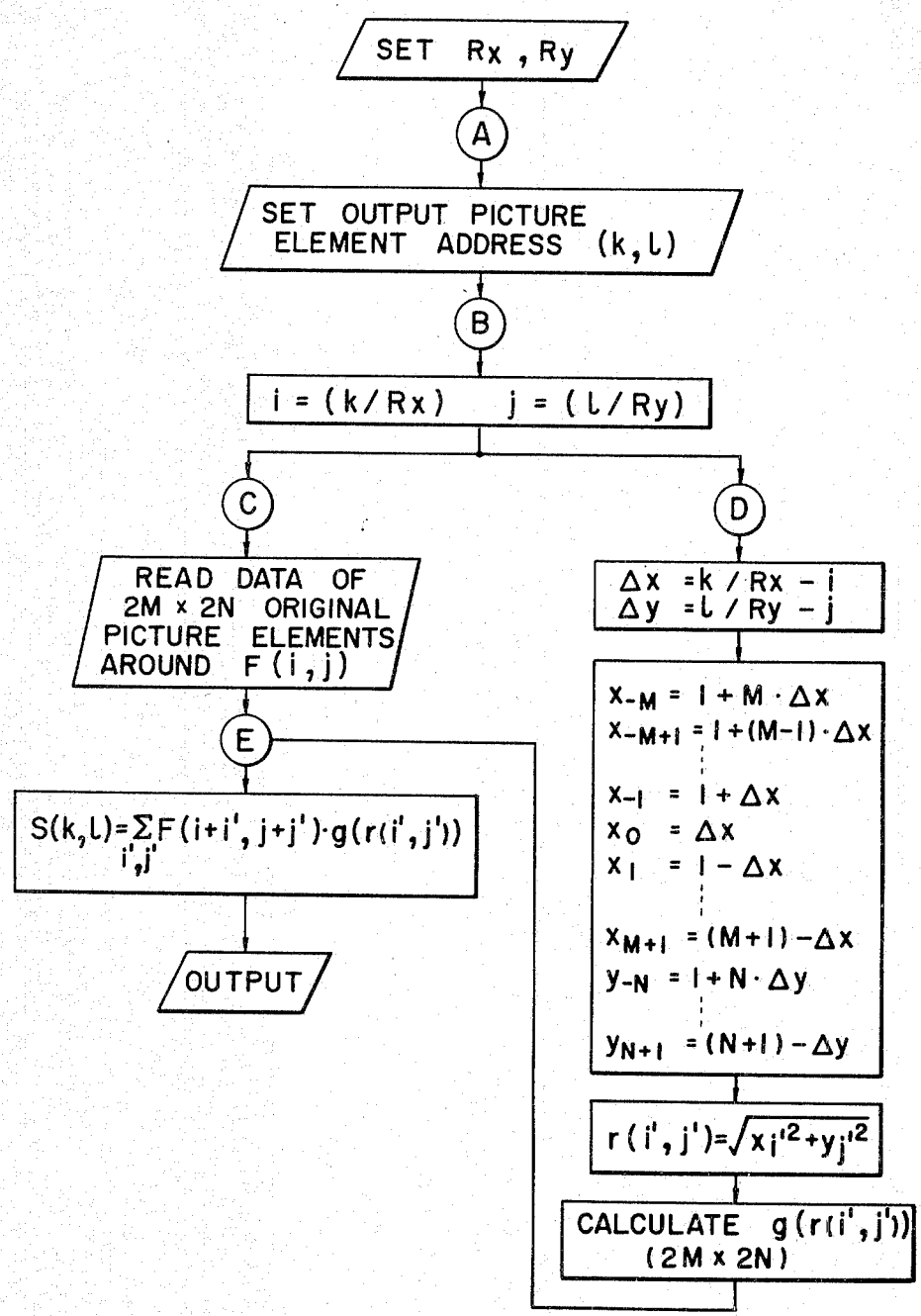
FIG. 2 is a flow chart showing one example of a conventional picture deforming process.

In the conventional picture deforming process, it is necessary to perform calculation whenever a value (k,l) is set, in the calculation of the equations (4). However, according to the invention, this necessity is eliminated. That is, in the invention, predetermined values can be repeatedly used in the steps D and E in FIG. 2. In other words, values required in the steps D and E for calculating a weight coefficient $g\{r(i',j')\}$ are limited by adding the conditions of the equations (6) in setting the magnification variation factors, and therefore if the weight coefficient $g\{r(i',j')\}$ is calculated in advance when the magnification variation factors Rx and Ry are set, so that the calculation result is stored in a memory device and is then suitably read out of it when necessary, then the processing can be considerably simplified.

One preferred example of the picture deforming process according to the invention will be described with reference in FIGS. 4 and 5.

Figure 4:
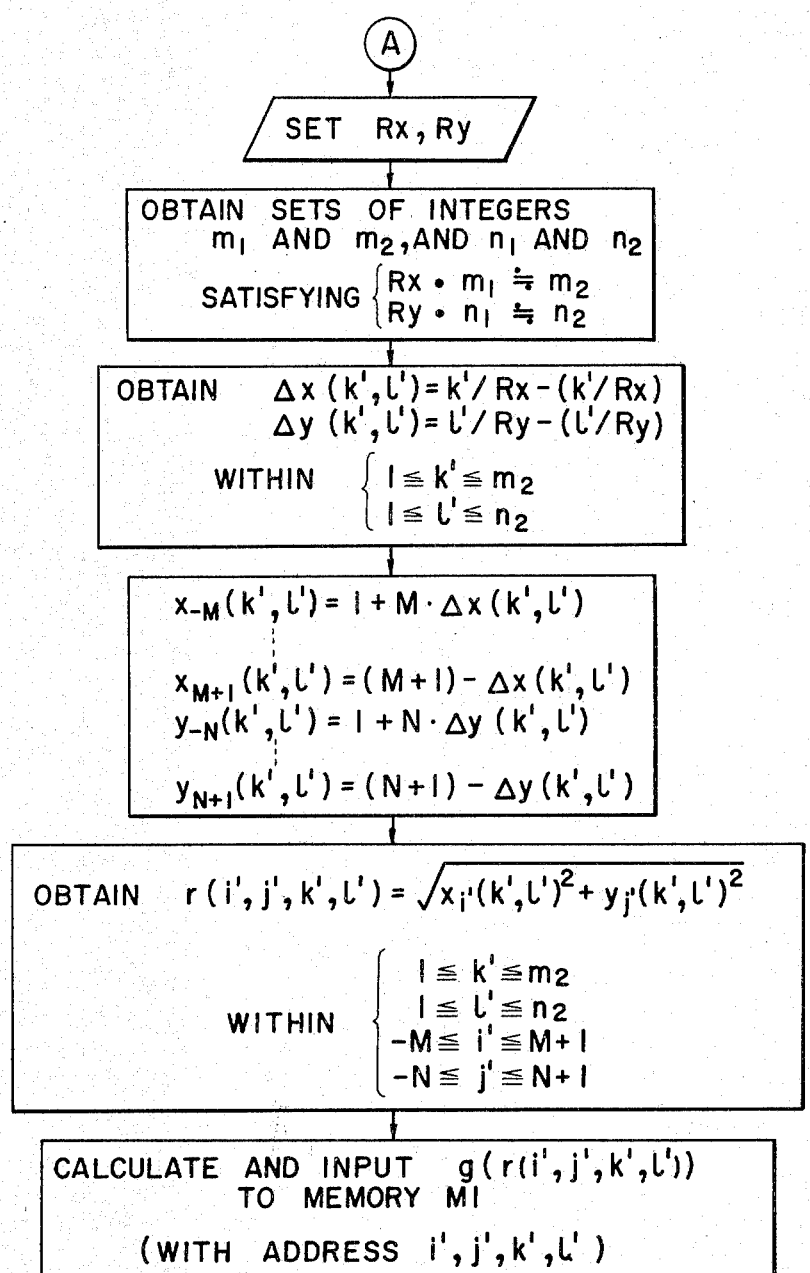
FIGS. 4 and 5 are two parts of a flow chart showing one example of the picture deforming process according to the invention.

In the process of the invention, the step A–B in FIG. 4 is carried out before an original picture is read by a picture input and output device for instance. More specifically, in the first step, magnification variation factors Rx and Ry are set. Then, in the second step, sets of integers $m_1$ and $m_2$, and $n_1$ and $n_2$ satisfying the equations (6) are selected, and in the third step, calculation is carried out according to the equations (4) within the ranges $1 \leq k' \leq m_2$ and $1 \leq l' \leq n_2$ which are defined by the sets of integers thus selected. In the fourth step, the positions of a plurality of surrounding picture elements are calculated, and in the fifth steps, the distances between an output picture element and the surrounding picture elements are calculated in the predetermined ranges $1 \leq k' \leq m_2$, $1 \leq l' \leq n_2$, $-M \leq i' \leq M+1$, and $-N \leq j' \leq N+1$. In the sixth step, a weight coefficient $g\{r(i',j',k',l')\}$ is obtained and is then stored in a memory device. As is clear from the above description, all of the processes in the step A–B can be achieved irrespective of original picture and read data, and therefore can be accomplished before the reading of the original picture is started.

Figure 5:
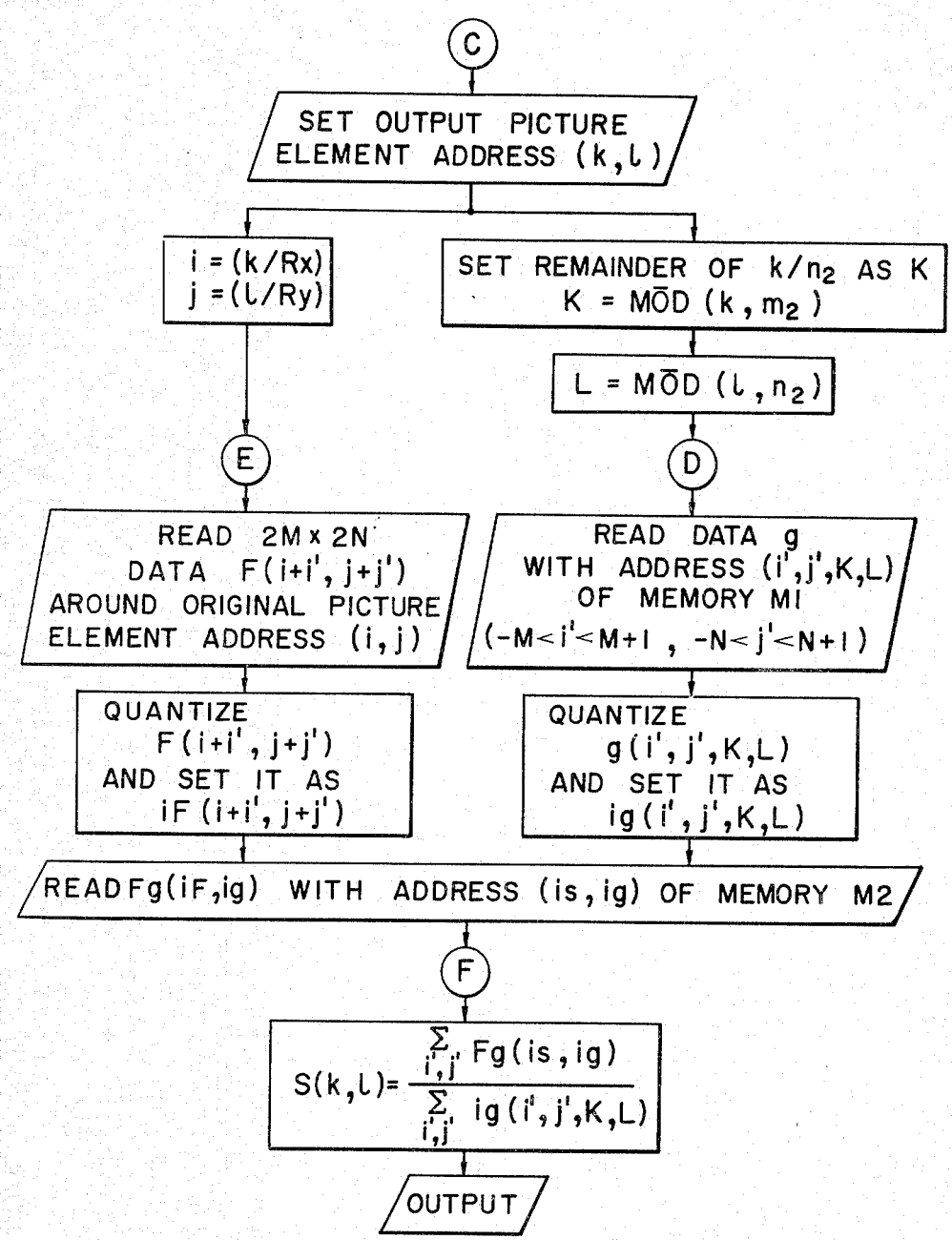

After the above-described preliminary process has been achieved, the original picture is subjected to deformation process while being read according to the steps C–F in FIG. 5. More specifically, when the address (k,l) of an output picture element is set, in the step C–E the values i and j are calculated as was described before. Thereafter, the data of the original picture was inputted, and the data F(i+i', j+j') of 2M×2N original picture elements surrounding the output picture element address-converted are read and quantized. At the same time, in the step C–D, a process for reading predetermined data (a weight coefficient g) out of the memory device according to the set address (k,l); that is, remainders obtained by dividing k and l by $m_2$ and $n_2$ are set as K and L, respectively, so that the read address of the memory device is modeled. Then, the data of the address (i', j', K, L) is read out of the memory device, and the read weight coefficient g is quantized. Then, in the step immediately before F in FIG. 5, the product $g(k,l) \cdot F(x+k, y+l)$ of the weight coefficient g and the original picture element F is not calculated with respect to the set (k,l), but instead the data Fg of an address (iF, ig) is read out of another memory device in which the calculation result has been, in advance, stored, and finally the output picture element $S(k,l)$ is calculated from the data Fg and the quantized weight coefficient ig.

In order to determine one output picture element $S(k,l)$, it is necessary to use the data of a plurality of original picture elements $F(i,j)$ and the relevant weight coefficients. Therefore, the steps E–F and D–F are carried out $2M \times 2N$ times, respectively. In practice, $M=N=1$, or $M=N=2$.

The output picture element $S(k,l)$ is obtained, and the density level of the deformed picture is determined as described above. In the step of obtaining S in FIG. 5, a method is employed to reduce the time required for division in which division values calculated in advance are read out of a memory device having values $\Sigma Fg$ and $\Sigma ig$ as addresses.

One example of a circuit for practicing the picture deforming process as described above is as shown in FIG. 6.

In the circuit, magnification variation factors Rx and Ry are set by a magnification variation factor setting unit 1, and then according to the factors Rx and Ry thus set, sets of values $m_1$, $m_2$, $n_1$ and $n_2$, values $\Delta x(k', l')$ and $\Delta y(k',l')$ and values $r(i',j',k',l')$ are calculated by an arithmetic circuit 2 within the range of values M and N which are predetermined. Then, a weight function calculating circuit 3 provides a weight function $g\{r(i',j',k',l')\}$. In this connection, the function $g(x)$ may be stored in a read-only memory (ROM) in advance since it has been given by the equation (5) described above. In this manner, weight functions g are obtained for all of the sets available for $(i',j',k',l')$ and are stored in a random access memory (RAM) 4 with $(i',j',k',l')$ as addresses. Thus, the original picture data inputting conditions have been satisfied.

The original picture data read by an image sensor 5 are temporarily collectively stored in a random access memory (RAM) 6, and are successively read out of the memory 6 to be introduced to a quantizer 8 in response to signals from a counter 7, so that they are quantized in the quantizer 8. A clock signal generator 9 applied clock signals successively to counters 10 and 11, and the contents of the counters 10 and 11 are used as the address $(k,l)$ of an output picture element (the counters 10 and 11 corresponding respectively to l and k). The contents of the counters 10 and 11 are applied to an MOD arithmetic unit 12, where values K and L are calculated. On the other hand, the outputs of the counters 10 and 11 and the arithmetic circuit 2 are applied to an address conversion random access memory 13, where $i=[k/Rx]$ and $j=[l/Ry]$ are provided. Upon setting the magnification variation factors, data $(i,j)$ corresponding to all the values of k and l (integers) in the block A have been obtained and the table of the data $(i,j)$ has been set in the random access memory 13. A high speed clock signal generator 14 applies clock signals having a period higher than $2M \times 2N$ times the reading period of a picture element to the counter 7, and with the aid of the output of the counter 7, $2M \times 2N$ data $F(i+i', j+j')$ around the data $(i,j)$ obtained in the random access memory (RAM) 13 are introduced to the quantizer 8. At the same time, the clock signals from the clock signal generator 14 are applied to a counter 15, so that $2M \times 2N$ values $g(i', j', K, L)$ are read out of the random access memory 4 and applied to a quantizer 16.

The product Fg of F and g which has been stated in a read-only memory 17 with data (iF,ig) obtained by the quantizers 16 and 8 as an address, is read out of the read-only memory 17 and applied to an adder 18, where the value Fg is subjected to addition $2M \times 2N$ times in the sweep range of i'. Similarly, the output ig of the quantizer 16 is applied to another adder 19, where the value ig is subjected to addition $2M \times 2N$ times in the sweep range of j'. Finally, the output of the adder 18 is applied to a quantizer 20, where it is quantized. Then, the thus quantized value iF together with the output ig of the adder 19 is applied to a read-only memory 21, so that the data of the address (iF,ig) subjected to division is read out. Thus, the data $S(k,l)$ of the address (iF,ig) together with the output of the adder 19 is read out and delivered out as a deformation process signal.

If the address $(k,l)$ of an output picture element is set by the counters 10 and 11, the corresponding original picture data address $(i,j)$ value is obtained by the random access memory 13, and the data is read out; then a part of the data in the random access memory 6 serving as a picture memory becomes unnecessary. However, it should be noted that when $(k,l)$ is newly set, the part of the data in the random access memory 6 becomes not always unnecessary. In the case of Rx and Ry larger than one (Rx, Ry > 1) (in the case of enlargement) the same value may be used more than two times (inclusive). In the case of Rx and Ry smaller than one (Rx, Ry < 1) (in the case of contraction), more than two data (inclusive) may become unnecessary with the magnification variation factors set once. This can be determined from the difference between $(i,j)$ obtained before an address $(k,l)$ is set and $(i',j')$ obtained after the next address $(k',l')$ is set newly (in increment).

In FIG. 6, a memory controller 22 operates to erase the original picture data which became unnecessary in the random access memory 6 and to apply new data to the memory 6 as much as the data thus erased.

According to the picture deforming process of the invention, in deforming an original picture by changing the picture element pitch of original picture data read by the picture element, a set of weight coefficients g for all the picture elements calculated according to a preselected deformation percentage are stored in a first memory means in advance, the weight coefficients g are read out of the first memory means whenever original picture data F are successively read, the contents Fg of a second memory means in which calculation results $F \times g$ have been stored in advance are read out according to addresses defined by the data g thus read out and the original picture data F, addition of the data Fg and addition of the data g are carried out respectively, and the addition result of the data Fg is divided by the addition result of the data g (in the above-described example, the contents of the read-only memory in which the division results have been stored in advance being read out), whereby a deformed picture is obtained through arithmetic process. Thus, the picture deforming process can be achieved at high speed through a relatively simple arithmetic process. The circuit for practicing the process is simple in arrangement and low in manufacturing cost.

What is claimed is:

1. A process of deforming an original picture by changing picture element pitches among the data of the original picture which are read by sampling the original picture by the picture element, comprising the steps of:

selecting a deformation percentage to be performed on the original picture;

calculating a set of weight coefficients for all the picture elements according to said selected deformation percentage and storing said weight coefficients in a first memory means;

successively reading original picture data and simultaneously reading out said stored weight coefficients in said first memory means;

calculating the product of said original picture data and said weight coefficients and storing the result of said calculation in a second memory means;

reading out of said second memory means said product calculation according to addressed defined by the original picture data and the data of the weight coefficients previously stored;

adding together each of said read out calculation product of said original picture data and said weight coefficient and each of the data of the weight coefficients, respectively;

dividing the addition result of the original picture data by the addition result of the weight coefficient data; and outputting a deformed picture processed signal.

2. A process as claimed in claim 1, wherein the deformation percentage determination involves the setting of magnification variation factors Rx and Ry which satisfy the following equations:

$$Rx \times m_1 = m_2$$

$$Ry \times n_1 = n_2$$

where $m_1$, $m_2$, $n_1$ and $n_2$ are integers, and $$1 \leq m_1 (\text{or } n_1) \leq 30$$

$$1 \leq m_2 (\text{or } n_2) \leq 30.$$